April 16, 1968        V. E. HAMILTON        3,378,421
METHOD OF PRODUCING AMBIENT LIGHT TRAPPING FILTER
Filed April 8, 1964        2 Sheets-Sheet 1
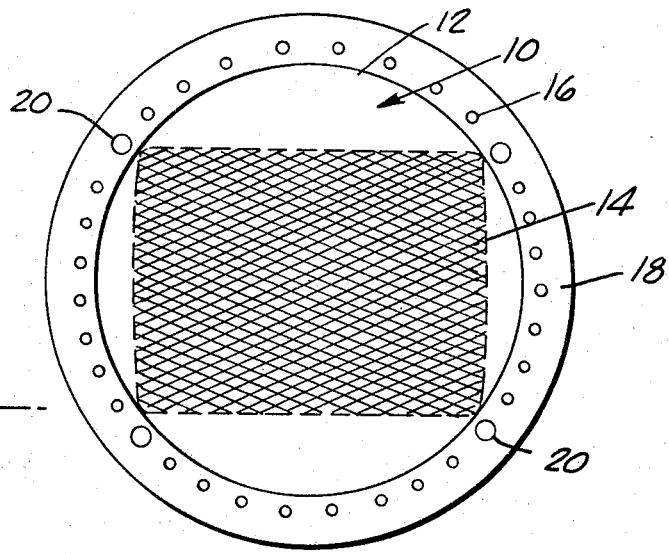
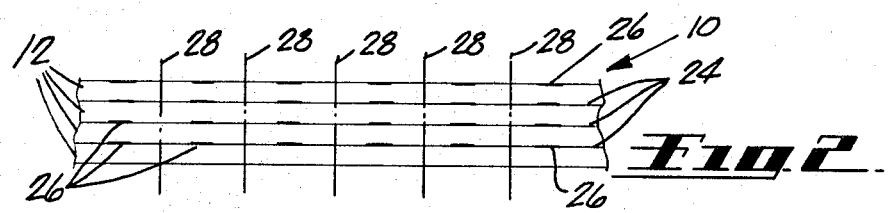
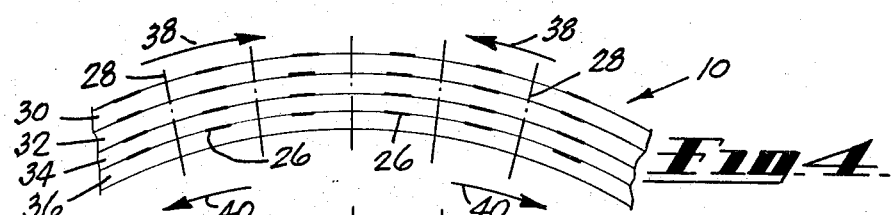
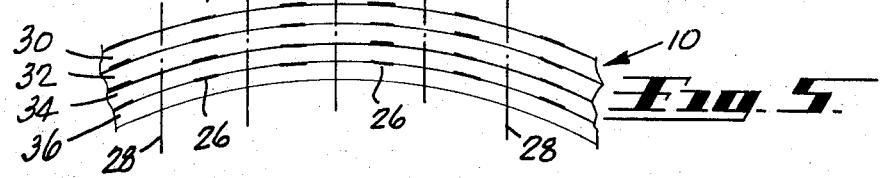
INVENTOR.
VERN E. HAMILTON
BY Edwin Coates
-ATTORNEY-

INVENTOR.
VERN E. HAMILTON

Patent 3,378,421

3,378,421
METHOD OF PRODUCING AMBIENT LIGHT TRAPPING FILTER
Vern E. Hamilton, Palos Verdes Estates, Calif., assignor, by mesne assignments, to McDonnell Douglas Corporation, Santa Monica, Calif., a corporation of Maryland
Filed Apr. 8, 1964, Ser. No. 358,297
12 Claims. (Cl. 156—224)

ABSTRACT OF THE DISCLOSURE

Method of producing concavo-convex space lattice filter includes providing flat blank of plurality of layers of heat formable plastic material united by thin films of cement, the layers bearing grid patterns in depthwise registry to provide substantially collimated depthwise viewing cells, partially setting the cement, heating the blank, bulging it to dome shape with diverging cells, cooling the blank, bulging it in the opposite direction with diverging cells, continuing the setting of the cement and returning the cells toward collimation by creep of the layers with respect to each other.

---

This invention lies in the field of ambient light trapping filters, and relates particularly to a space lattice type filter which is formed with surfaces of double curvature and to a method and apparatus which will produce such filter with the viewing cells collimated or in other predetermined directional relationship.

The type of filter with which this invention is concerned is used to prevent the impingement of off-axis ambient light rays from striking the surface of a diffuse radiant screen which presents reproduced images. Such screen may be a motion picture screen, or the screen of a cathode ray tube whether used for radar or laboratory work or for home television. The filter traps both diffuse and concentrated light approaching the screen from angles outside the viewing angle, thus preventing all angular reflections which degrade the image contrast, and consequently improving the quality of the image which is viewed. The complete theory of operation and general features of design are disclosed in my copending patent application entitled Ambient Light Filter, Ser. No. 230,644, filed Oct. 15, 1962.

Briefly, the filter disclosed in my prior application comprises, in one form, a filter body or panel laminated from a plurality of layers of transparent plastic material secured in facewise relation with transparent cement. Preferably each layer carries on one face a grid pattern consisting of alternating areas of transparent and light absorbing material. These patterns are substantially identical and are depthwise spaced and in depthwise registry to produce a multiplicity of depthwise directed viewing cells, each bordered by a lattice of depthwise spaced light absorbing areas which intercept light rays entering the cells at angles beyond the normal viewing angle and absorb their energy, in effect extinguishing them. The axes of the viewing cells in the flat panel are substantially parallel, or collimated. The layers in the panel are very thin and few in number, seldom exceeding ten, so that the filter body as a whole is less than one eighth inch thick, and in many cases it is less than one sixteenth inch thick.

Considering the case of a television picture tube, the filter is placed closely in front of the front wall of the tube with its plane generally normal to the axis of the tube and the axes of the viewing cells generally parallel to the axis of the tube, and a light shield covers the gap between the periphery of the tube and the margin of the filter to prevent any light rays from reaching the tube directly. Those light rays which enter the filter at angles greater than the "viewing" angle are intercepted and absorbed by the light absorbing areas of the filter. While this arrangement greatly improves the image seen by the viewer, it has been found desirable for various reasons to form the filter with surfaces of double curvature, specifically spherical, so that it will nest very closely to the tube wall at all points and may even be cemented directly thereto.

Unfortunately, when the filter is bulged to provide the desired concavo-convex form the change in shape results in a corresponding change in the relation of the viewing cells to each other. As the curvature of the panel progresses at temperatures suitable for forming the plastic material used for the filter, the outermost layer stretches more than the innermost layer and the stretch of intermediate layers is in accordance with their position. The result is that the axes of the cells remain practically normal to the surface of the panel at their points of intersection with it, and therefore they diverge from each other in the same manner as the many radii of the sphere. While the few cells adjacent the axis of the tube may be considered parallel to that axis the cells diverge more and more as they are located farther from the axis and closer to the periphery.

While the viewing angle of any one individual cell is enlarged only minutely by the differential stretching the compound viewing angle of the filter as a whole is greatly enlarged and much more off-axis ambient light is enabled to reach the screen and degrade the image. At the same time, because of the divergence of the viewing cell axes, the percentage of light transmission to any given viewing point from the various parts of the screen varies with the divergence and makes an unsatisfactory picture. If the view point is on the axis of the tube, the picture darkens toward the edges. If the view point is well off to one side of the axis, the near side of the picture is quite bright and the far side is quite dark. If the divergence is great enough the far margin may be blacked out completely.

The purpose of the present invention is to overcome the difficulties and disadvantages pointed out above while retaining the benefits of the concavo-convex filter by producing a filter of the desired double curvature in which the viewing cells are collimated or arranged with slight divergences or convergence for reasons mentioned hereafter.

The method, broadly stated, comprises laying up a laminate of flat filter elements, each element consisting of a layer of heat formable plastic material bearing at least on one surface an appropriate grid pattern of transparent and light absorbing areas identical to the grid patterns on the other layers, and securing them in facewise relation with a transparent cement to form a blank. The grid patterns of the elements are arranged in depthwise registry and index formations are provided in all of the layers. At present the index formations are apertures at the margin of the blank through which guide pins pass to retain the layers against any lateral relative sliding movement which would disturb the registry of the grid patterns.

The cement is preferably a catalytic type which sets or cures at a known rate under given conditions, which rate can be controllably varied by modifying the conditions. Usually the layers are pressed together firmly to force out air bubbles and excess cement, to thin down the cement film between layers, and to increase the adhesion by virtue of the intimate contact. After the cement has partially set so that it has great resistance to peeling but is still susceptible to very slow cold flow in shear, the blank is heated up to the forming temperature of the plastic material, the margin of the blank is restrained, and the mid-portion is bulged to the desired curvature. Although the forming may be done with dies, it is presently preferred to employ the blowing technique by applying an air pressure differential across the thickness of the blank. Very shortly after the forming is completed the blank is cooled, usually to room temperature, and the bulge is now set.

Just as in the situation described above, the axes of the viewing cells diverge in accordance with the curvature of the bulge. However, the blank is now manipulated to force the bulge through the plane of the margin of the blank to produce the same bulge on the opposite side. Again the axes of the viewing cells diverge in accordance with the curvature of the bulge. However, at this time the previous innermost layer has become the outermost layer and the previous outermost layer has become the innermost layer. Consequently, the new outer layer is in tension and the new inner layer is in compression and there is a generally uniform stress gradient in the intermediate layers. Since the outer layer wants to shrink and the inner layer wants to expand, the stresses are working to reduce the divergence of the viewing cell axes. If the cement were completely set the panel would in effect be integral and the stresses could accomplish no correction. However, the cement is only at an intermediate stage and is still susceptible to cold flow. Therefore each layer creeps back toward its no-stress or neutral dimension and the viewing cells move towards collimation.

Theoretically the final stage would be a convergence of cell axes about equal to the previous divergence, but there are several factors which prevent this result. The dimensional distortion of the layers caused by the "snap-through" is elastic and therefore as recovery progresses the restoring forces decrease. A certain amount of force is necessary to overcome the resistance of the cement to the cold flow shear and therefore the recovery will stop while there is still a certain amount of stress in the panels. In addition, during the recovery period the cement is continuing to approach the condition of complete set and hence the cold flow resistance is increasing. In turn, recovery is stopped with even more stress remaining in the panels. It will be apparent that the variables may be adjusted to obtain any desired amount of recovery, from divergence to convergence, by changing the setting period before bulging, by varying the curing temperature, by raising the temperature at a selected time to accelerate setting, or by other modifications.

The condition of substantial collimation of viewing cell axes is the most universally useful and acceptable. In some cases where the ambient light problem is less serious than usual and viewers need a wide range of position while viewing, as in some shop oscilloscope installations, a slight amount of divergence within the limits of blacking out the margins of the screen is helpful and desirable. At the opposite extreme, the user of the small personal television receiver has a relatively fixed eye position on or close to the tube axis, and some convergence will give him a better view of the screen and also trap even more of the unwanted ambient light.

The bulged blank may be snapped through the plane of its margin by manual pressure applied progressively toward the center or by the use of a roller operated inwardly toward the center. When the forming apparatus includes a fixture which applies an air pressure differential to form the bulge, it may be operated to reverse the direction of the differential to snap the bulge through.

Various other advantages and features of novelty will become apparent as the description proceeds in conjunction with the accompanying drawings, in which:

FIGURE 1 is a plan view of a blank with a typical grid pattern, and a clamp ring applied to the margin;

FIGURE 2 is a sectional view on a greatly enlarged scale of a portion of the blank of FIGURE 1;

FIGURE 3 is a view similar to FIGURE 2 showing the blank bulged and the axes of the viewing cells diverging;

FIGURE 4 is a view similar to FIGURE 3 showing the bulge snapped through to the opposite side and the viewing cell axes diverging in the new direction;

FIGURE 5 is a view similar to FIGURE 4 showing the viewing cells collimated after partial recovery;

FIGURE 7 is a perspective view of a bulged blank and a roller in position to advance over the bulge and cause it to snap through; and FIGURE 8 is a sectional, elevational view of a modified apparatus for blow forming the blank and for causing the bulge to snap through.

Figure 6:
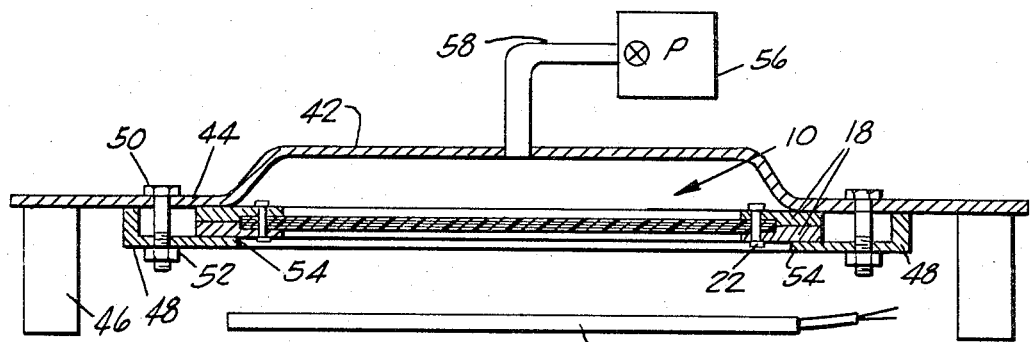
FIGURE 6 is a sectional, elevational view of a simple apparatus for blow forming the blank.

A typical blank 10 for use in carrying out the process of the invention is illustrated in FIGURE 1, and comprises a plurality of layers 12 of a suitable heat formable transparent plastic material facewise united by a suitable transparent cement. There are various criteria for these materials which must be satisfied in order that the end product will be well suited for the intended purpose.

The plastic sheet material for the layers must be tough over a broad temperature range, should have high tensile strength and elongation, and should show good retention of strength characteristics at elevated temperatures. It should have good optical clarity and high light transmission characteristics over the visible spectrum. Polycarbonates and polystyrenes have been found to be eminently suitable for the purpose. The cement, which is preferably catalytic setting or curing, should be as transparent as the layers, it should have flexibility and high adhesion. it should have cold flow characteristics suited to the process, and its rate of setting or curing should be variable within reasonable, useful limits by selective modification of ambient conditions. It is also important that it does not gasify or delaminate at the forming temperatures of the plastic layers. Polyurethane resins answer these requirements very well. The particular materials used are fully disclosed, discussed, and claimed in the companion patent applications of Vern E. Hamilton and Luther M. Roseland for Spherical Shaped Plastic Filter for Cathode Ray Tube, now Patent No. 3,341,391, dated Sept. 12, 1967, and of Luther M. Roseland for Bonding Material for Plastic Laminates, filed Apr. 8, 1964, Ser. No. 358,241.

Each layer 12 has on one face thereof a suitable grid pattern substantially identical to the patterns on the other layers. As shown, the pattern comprises a multiplicity of lines extending diagonally in two directions and intersecting to define a diamond grid 14 of alternating areas of transparent and highly light absorbing material. The layers are so adjusted that the grid patterns are in depthwise registry and the viewing cells are substantially collimated. Index formations in the form of apertures 16 are formed in the margins of the layers in predetermined index relation to the grid patterns and a pair of clamp rings 18, provided with matching apertures, are applied to opposite sides of the margin of the panel. A few special apertures 20 pass through the clamp rings and the panel and receive fasteners 22, FIGURE 6 of any suitable type, such as screw and nut, to secure the clamp rings firmly to the panel margin. Either of the rings carries index pins, not shown, which pass through and fit tightly in apertures 16 to maintain all of the layers in predetermined relation.

FIGURES 2 to 5 constitute idealized representations of a section through a part of the panel of FIGURE 1 and are greatly exaggerated in both dimensions and curvature in order to more readily illustrate the invention. In actuality the layers 12 are usually of the order of .005 inch thick and the grid lines and spaces may be in about the proportions shown. As seen in FIGURE 2, the layers 12 are flat and are secured together facewise by very thin layers of transparent cement 24. The blank is usually placed in a press to squeeze out excess cement and air bubbles and to increase the adhesion of the layers. Grid lines 26 are of the same width and are spaced apart uniformly both laterally and depthwise to produce a multiplicity of depthwise directed viewing cells, the axes of which at this time are collimated and normal to the plane of the panel.

After the basic panel is made up as indicated in FIGURES 1 and 2, it is allowed to stand for a suitable time, which may be several hours, to cause the cement to become partially set. This increases the resistance to peeling or delaminating, which must not occur during the subsequent forming operations, while still permitting a degree of "cold flow." The blank is then heated to forming temperature and preferably placed in an apparatus such as shown in FIGURE 6 and described later. The margin of the blank is restrained by means of clamp rings 18 and the mid-portion of the blank is bulged out as indicated in FIGURE 3. During this operation each of layers 30, 32, 34, and 36 is stretched, outer layer 36 stretching the most and inner layer 30 stretching the least. After a short dwell of a minute or so the blank is quickly cooled and the bulge retains its shape. The progressive stretching of the layers has resulted in a fanning out or divergence of viewing cell axes 28 as seen in FIGURE 3. The divergence of course is three dimensional since the bulge is spherical.

It can be readily seen that the divergence of the boundaries of any one viewing cell is minute and hence there is no appreciable change in the viewing angle of any one cell. However, the compound viewing angle is the viewing angle of a single cell plus the angle of divergence between the axes of the most remote cells at opposite points of the margin. This compound angle is substantially increased by the bulging, and there is a corresponding decrease in the amount of unwanted ambient light blocked out. It is also apparent from FIGURE 3 that no matter where a line of sight is chosen the increasingly remote cells will increasingly cut down light transmission to the eye as they diverge more and more from the line of sight. This produces darkened margins of the scene and, if the line of sight substantially coincides with the cell axes near one side of the screen, the other side may be blanked out completely.

Although the blank has been cooled and the bulge will retain its shape, the cement 24 is still only partially set because the heating, forming, and cooling are carried out very quickly, the elapsed time being usually well under ten minutes. It is still capable of cold flow but the rate of yield is extremely slow. Consequently in a short term movement the panel will act as though it were integral. By one of several means described below, the bulge is forced through the plane of the margin so that its protrudes in the opposite direction as shown in FIGURE 4. Since the panel acts as an integral unit, new outer layer 30 is stretched and new inner layer 36 is compressed, and there is a fairly uniform stress gradient in the intermediate layers 32 and 34. The neutral axis (between stretch and compression) is very close to the boundary between layers 32 and 34.

In the new position the axes 28 of the viewing cells still diverge outwardly. Conditions are not the same, however, as in FIGURE 3 because of the stresses indicated by the tension arrows 38 and the compression arrows 40. Since the plastic was not heated to forming temperature and the cement 24 held the layers together as an integral unit during the snap-through, the stretch and compression deformation was elastic, and arrows 38 and 40 represent the elastic restoring forces in the layers. These forces are resisted by the shear strength of the incompletely set cement, but they are stronger so they gradually creep toward neutral position and condition, causing cold flow of the cement. If all of the layers recovered completely, the axes of the viewing cells would converge.

The restoring forces are elastic and therefore they gradually diminish as the stresses proceed toward neutral. By the time the axes of the cells reach a position of collimation, as shown in FIGURE 5, these forces are reduced by half. Even with no change in the cement these reduced forces are abount balanced by the shear strength of the cement. However, the cement becomes firmer with time and therefore may well stop recovery even before collimation is achieved. The point where recovery is stopped can be controlled by the extent of curing before forming, and by temperature control after forming, as well as by other means. Substantial increases in temperature can be used to accelerate curing to stop recovery at desired points. These matters are more fully discussed in the copending application of Luther M. Roseland, mentioned above.

It will be seen that with the method described above it is possible to produce a space lattice filter which is made concavo-convex to conform to the front wall of a cathode ray tube and to tailor the directional relationship of the axes of the viewing cells to achieve collimation as in a flat filter or to obtain convergence or divergence as desired.

One preferred apparatus for use in practicing the method described is illustrated in FIGURE 6. Casing 42 has a planar perimeter 44 which extends radially some distance to constitute a marginal flange, to which are connected a plurality of supporting legs 46. A retainer ring 48 is secured to perimeter 44 by a series of bolts 50 with nuts 52. The inner margin 54 of the retainer ring contacts one of the clamp rings 18 and binds them sealingly against perimeter 44. The blank 10, sealingly gripped by rings 18 completes the closure of the casing. An air pump 56 is in communication with casing 42 by way of conduit 58 to furnish pressurized air to blow or bulge blank 10 to the desired curvature.

The blank with its clamp rings, and with or without the pressure casing may be heated in an oven to bring the plastic to forming temperature, or a radiant heater 60 having a large flat surface facing the blank may be used. In any event, when the blank has been raised to the appropriate forming temperature, which is of the order of 250° F. with the materials mentioned, air pressure is applied and the blank is bulged to the desired extent. After a short dwell, the temperature is quickly reduced to set the plastic in shape.

The bulge may be snapped through to the new side by applying thumb or finger pressure to a margin of the blank on the high side and increasing the area of the zone which is being depressed. Application of pressure proceeds toward the center of the blank, and when about a third of the bulge has been pushed through, the balance of its snap through by itself.

Figure 7:
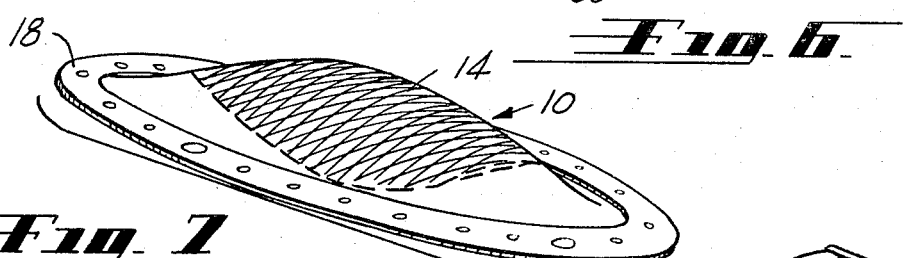

This operation can be made more mechanical by the use of an olive or barrel shaped roller 62, FIGURE 7, having a handle 64. Preferably the margin of the blank, with its clamp rings 18, is mounted on an annular support frame to provide sufficient clearance for the bulge to snap through without striking anything which would damage it.

After the bulge has been snapped through, the blank may be set aside for several hours until the cement is completely set or cured, with the recovery stopped at a predetemined point. No further changes will now take place, and the portion bearing the grid pattern is then cut out of the remainder of the blank and is ready for use. It may be mounted closely in front of the cathode ray tube or may be cemented directly to its front wall.

Figure 8:
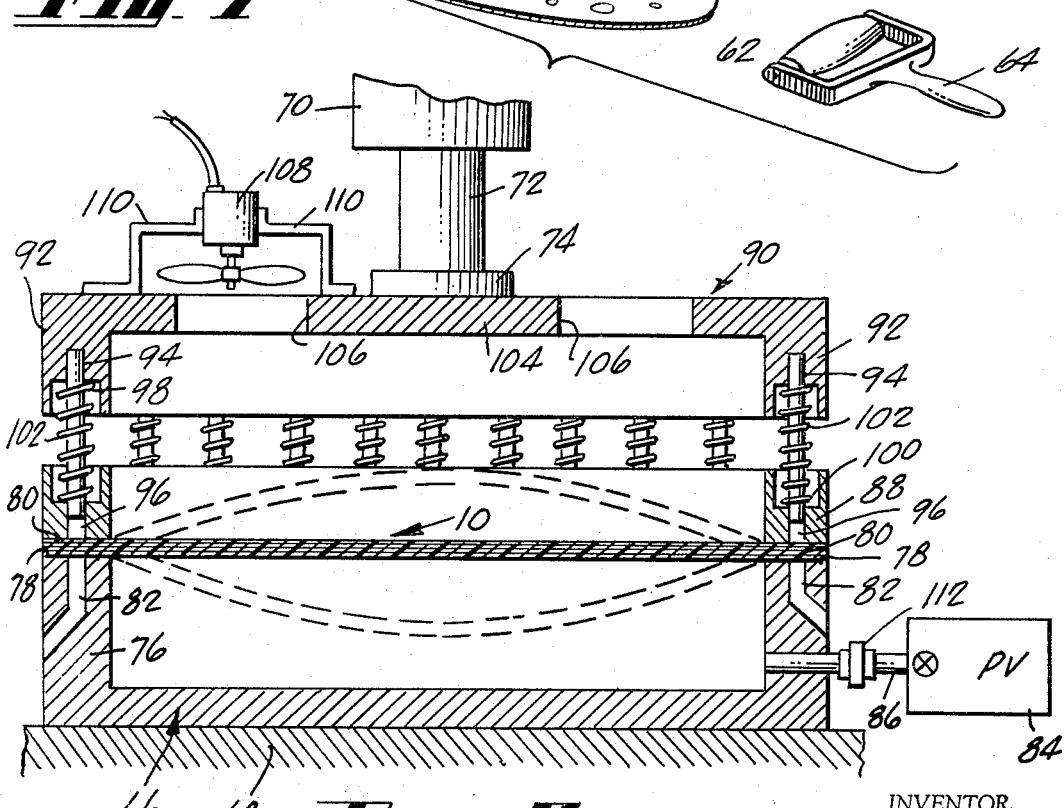

A modified forming apparatus is illustrated in FIGURE 8. In this type, a casing 66 is mounted on the bed 68 of a press which has a ram including a cylinder 70, piston rod 72, and pressure foot 74. The casing includes a generally annular side wall 76 having a planar margin 78 for sealing engagement with the margin 80 of blank 10 which does not use clamp rings 18 in this version. Side wall 76 incorporates punch pin slots and slug guides 82 for a purpose to be described. Pump 84 communicates with casing 66 through conduit 86 and may be operated to apply either pressure or vacuum to the interior of the casing under control of the operator.

Blank 10 in this version is provided only with the apertures 20 which would receive bolts 50. The wall 76 of casing 66 is provided with matching apertures, not shown, and clamp ring 88 is provided with guide pins, also not shown, which pass through the guide openings in wall 76 and blank 10 to align these parts as shown in FIGURE 8. The purpose of this arrangement is to first grip margin 80 of the blank firmly and then punch a plurality of additional guide holes through the margin comparable to holes 16 of FIGURE 1, and insert pins through these holes to prevent relative slippage during the forming operation.

To accomplish these things, a pressure ring 90 is provided. This ring includes a depending flange or wall 92 in which are mounted a plurality of punch pins 94 adapted to enter guide aperture 96 in ring 88 and apertures 82 in wall 76, punching guide apertures in margin 80 in the process. Spring recesses 98 are provided in the under side of ring 90 and spring recesses 100 are provided in the upper side of ring 88 to receive and guide the ends of compression springs 102 which surround punch pins 94 and resiliently separate rings 88 and 90. When pressure foot 74 is brought down on mid-portion 104 of ring 90, the ring moves down and applies axial force to ring 88 through the springs. This builds up a very substantial clamping pressure on blank 10 so that it is held against any slippage as pins 94 punch holes through the margin, the slugs dropping out through apertures or passages 82.

Punch pins 94 also serve as guide pins and remain in margin 80 throughout the balance of the operation. The ring 90 can be forced down until it directly contacts ring 88, thus positively clamping blank 10 in sealing engagement. The apparatus is now ready for the forming operation. The blank can be pre-heated or it may be mounted in place as shown, and clamped, and radiant heat may be applied. Ring 90 is provided with large apertures 106, and carries a fan 108 mounted on brackets 110. The fan may be connected to a supply of either hot or cold air to heat blank 10 for forming or to cool it after forming.

When the blank is heated to forming temperature pump 84 is operated to supply air under pressure to casing 66 to bulge blank 10. When the blank is formed, fan 108 is operated to cool the blank and set the bulge. When the blank is back to room temperature, pump 84 is operated to produce a vacuum in casing 66, which forces the bulge to snap through to the reverse position. The blank is held in position until the cement is thoroughly set. In order to remove the apparatus to free the press for subsequent work, conduit 86 is provided with a quick disconnect 112.

This apparatus works equally well if the pump first draws a vacuum to pull the bulge and then provides pressure to snap it through, although not as much force is available in one atmosphere for forming as can be applied when pressure is used for forming.

It will be apparent to those skilled in the art that various changes and modifications may be made in the construction and operations disclosed herein without departing from the spirit of the invention, and it is intended that all such changes and modifications shall be embraced within the scope of the following claims.

I claim:

1. A method of producing a space lattice type ambient light trapping filter having a concavo-convex form and having its viewing cells substantially collimated, comprising: providing a substantially flat blank in the form of a plurality of layers of heat formable plastic material face-wise united by thin films of cement, the layers bearing grid patterns arranged in depthwise registry to provide a multiplicity of substantially collimated depthwise directed viewing cells; partially setting the cement; heating the blank; bulging the mid-portion of the blank out of its plane into concavo-convex form with the viewing cells diverging outwardly; cooling the blank; forcing the bulge to the opposite side of the plane with the viewing cells diverging outwardly; continuing the setting of the cement; and gradually returning the cells toward collimation.

2. A method as claimed in claim 1; and completing the setting of the cement at a desired stage of collimation of the cells.

3. A method of producing a space lattice type ambient light trapping filter having a concavo-convex form and having its viewing cells substantially collimated, comprising: preparing a substantially flat blank in the form of a laminate of a plurality of layers of heat formable plastic material face-wise united by thin films of cement, the layers bearing substantially identical grid patterns in depthwise registry to provide a multiplicity of substantially collimated depthwise directed viewing cells; applying depthwise pressure to the laminate to bring the layers and films into intimate relation; partially setting the cement to increase its adhesion and consequent resistance to depthwise separation; heating the blank to forming temperature; restraining the margin of the blank and bulging its mid-portion out of its plane into concavo-convex form with the viewing cells diverging outwardly; cooling the blank to cause it to retain its bulge; forcing the bulge to the opposite side of the plane of the margin and producing the same concavo-convex form in the opposite direction with the viewing cells diverging in the new direction; putting the outer layer in tension and the inner layer in compression; and achieving a generally uniform stress gradient in the intermediate layers; utilizing the creep of the plastic and the cold flow of the cement to gradually relieve the stresses in the layers and causing the cells to gradually return toward collimation while continuing the setting of the cement; and accelerating the setting of the cement to terminate the cold flow when the desired stage of collimation has been achieved.

4. A method as claimed in claim 3; said heating, bulging, and cooling being accomplished in a maximum time of about ten minutes.

5. A method as claimed in claim 3; the acceleration of the setting of the cement being accomplished by raising the temperature of the blank to a level below the forming temperature of the plastic material.

6. A method of producing a space lattice type ambient light trapping filter having a concavo-convex form and having its viewing cells substantially collimated, comprising: preparing a substantially flat blank in the form of a laminate of a plurality of layers of heat formable plastic material face-wise united by thin films of cement, the layers bearing substantially identical grid patterns in depthwise registry to provide a multiplicity of substantially collimated depthwise directed viewing cells; applying depthwise pressure to the laminate to bring the layers and films into intimate relation; partially setting the cement to increase its adhesion and consequent resistance to depthwise separation; heating the blank to forming temperature; restraining the margin of the blank and bulging its mid-portion out of its plane into concavo-convex form with the viewing cells diverging outwardly; cooling the blank to cause it to retain its bulge; forcing the bulge to the opposite side of the plane of the margin and producing the same concavo-convex form in the opposite direction with the viewing cells diverging in the new direction; putting the outer layer in tension and the inner layer in compression; and utilizing the creep of the plastic and the cold flow of the cement to gradually relieve the stresses in the layers and causing the cells to gradually return toward collimation.

7. A method as claimed in claim 6; including decreasing the restoring forces in the plastic layers and increasing the resistance of the cement to cold flow as the cells gradually approach collimation; and balancing these forces to prevent complete stress relief and recovery of the plastic layers.

8. A method as claimed in claim 7; and increasing the resistance of the cement to cold flow sufficiently to halt the recovery of the plastic layers at a desired stage of collimation of the cells.

9. A method of producing a space lattice type ambient light trapping filter having a concavo-convex form and having its viewing cells in predetermined directional relation to each other, comprising: preparing a substantially flat blank in the form of a laminate of a plurality of layers of heat formable plastic material facewise united by thin films of partially set cement, the layers bearing substantially identical grid patterns in depthwise registry to provide a multiplicity of substantially collimated depthwise directed viewing cells; heating the blank to forming temperature; bulging its mid-portion out of its plane into concavo-convex form with the viewing cells diverging outwardly; cooling the blank to cause it to retain its bulge; forcing the bulge to the opposite side of the plane of the margin of the blank to produce the same concavo-convex form in the opposite direction and with the viewing cells diverging in the new direction; putting the outer layer in tension and the inner layer in compression; utilizing the creep of the plastic and the cold flow of the cement to gradually relieve the stresses in the layers, and reducing the divergence of the viewing cells; and stopping the recovery of said plastic layers when the viewing cells have achieved a predetermined directional relationship to each other.

10. A method as claimed in claim 9; including applying a curvature reversing force to a small area of the bulge adjacent the margin; gradually applying the reversing force along a line toward the center of the blank; and utilizing the stress in said bulge to complete the reversal.

11. A method as claimed in claim 9; said bulge being formed by restraining the margin of said blank and by the application of a substantially uniform air pressure differential to substantially the entire area of said blank while it is at elevated temperature.

12. A method as claimed in claim 11; said bulge being forced to the opposite side of the plane of its margin by continuing to restrain the margin and by reversing the effective direction of the air pressure differential.

References Cited
UNITED STATES PATENTS

| | | | |
|---|---|---|---|
| 2,612,079 | 9/1952 | Mahler | 156—229 |
| 2,917,783 | 12/1959 | Olson et al. | 264—89 |
| 3,026,232 | 3/1962 | Finch | 156—285 X |

EARL M. BERGERT, *Primary Examiner.*

R. A. KILLWORTH, *Assistant Examiner.*